July 14, 1942.  F. W. CURTIS  2,289,874
MILLING MACHINE
Filed Nov. 20, 1940  4 Sheets-Sheet 1

INVENTOR
FRANK W. CURTIS
BY Chapin & Neal
ATTORNEYS

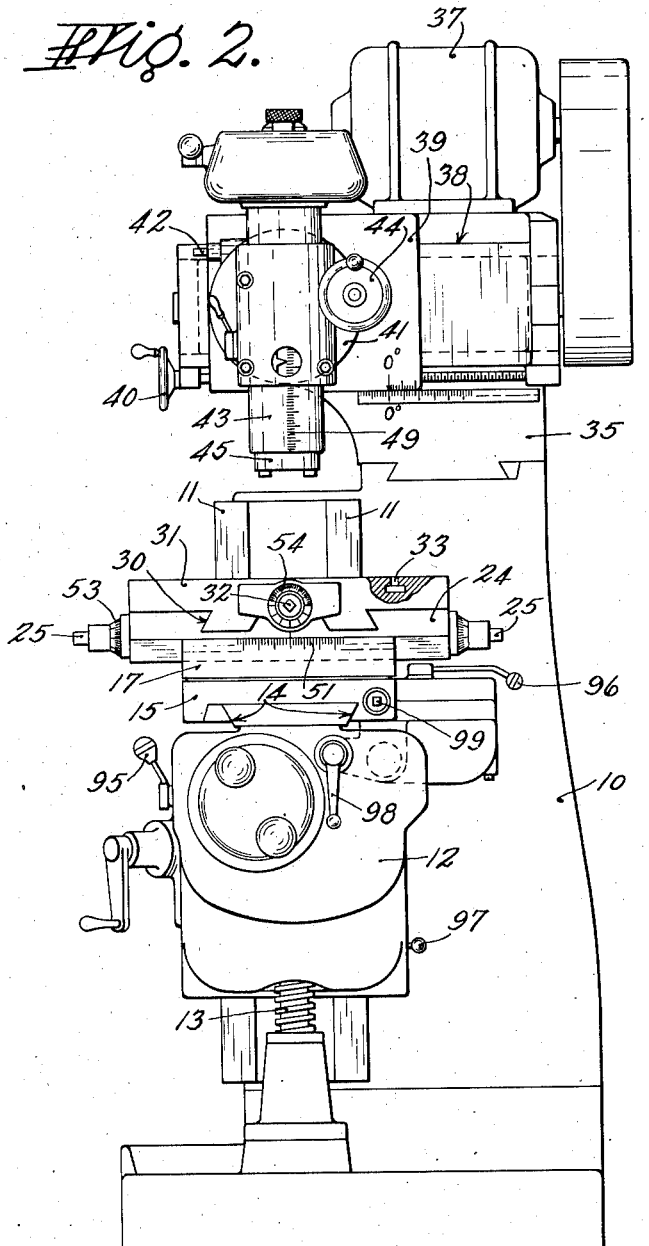

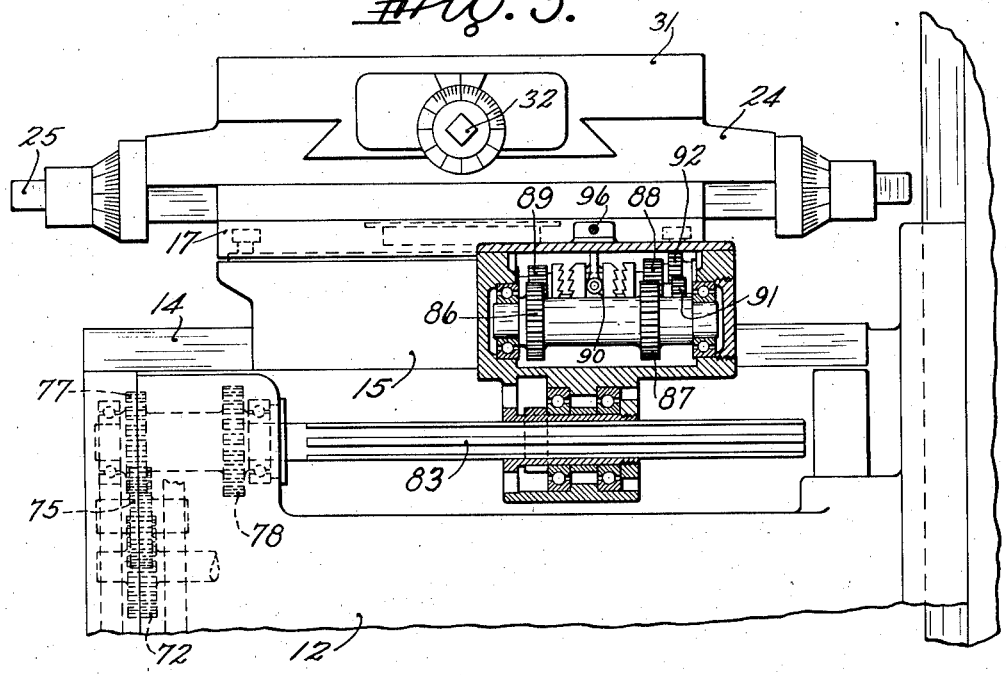
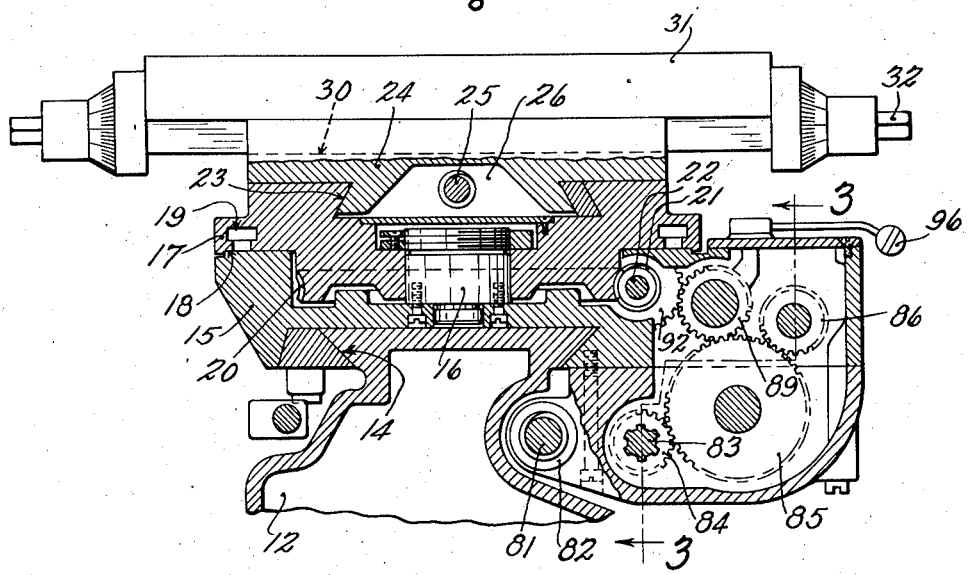

July 14, 1942.　　　F. W. CURTIS　　　2,289,874
MILLING MACHINE
Filed Nov. 20, 1940　　　4 Sheets-Sheet 4
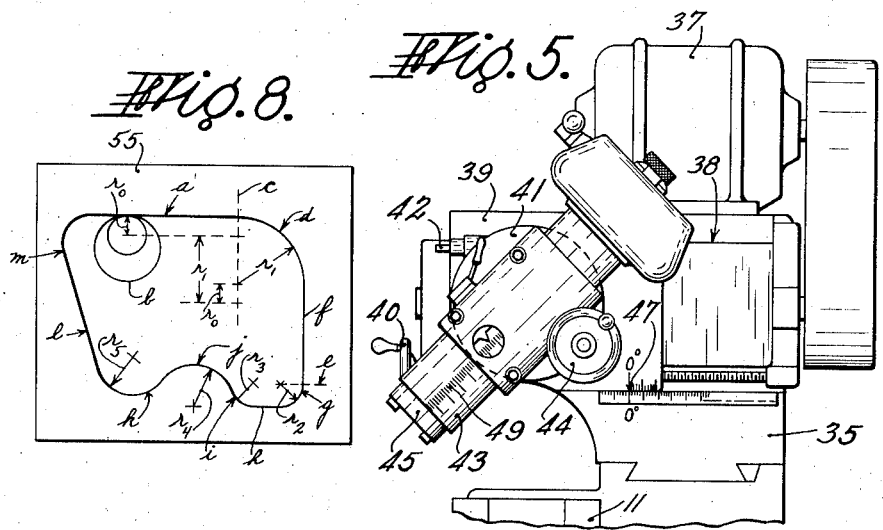
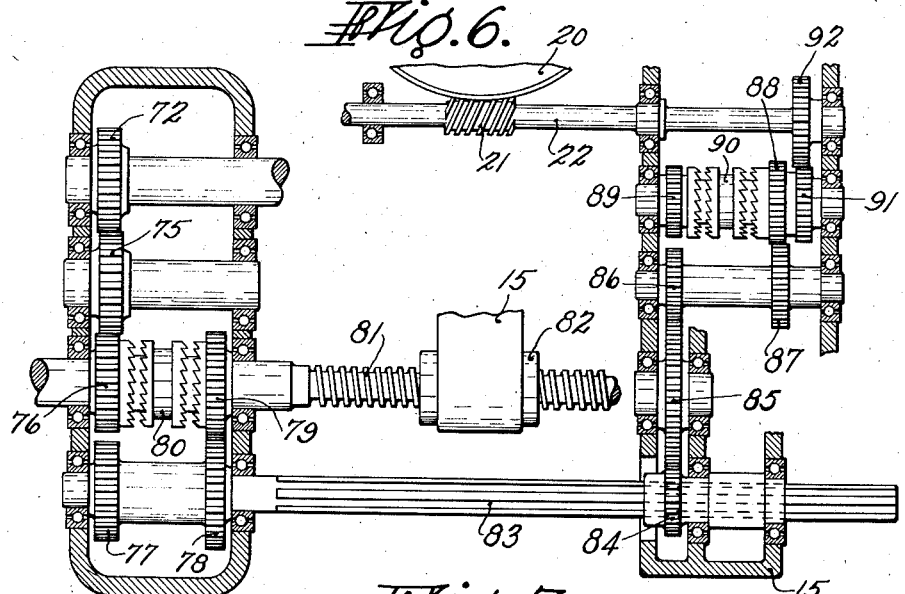
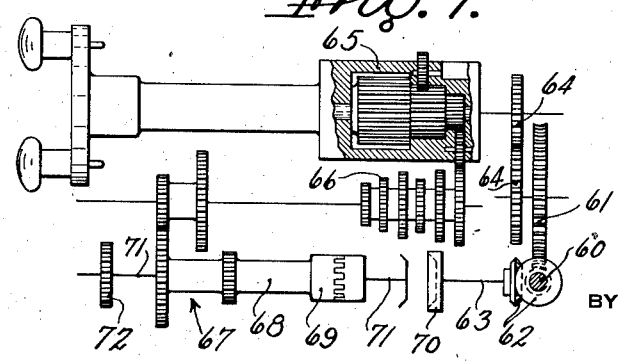
INVENTOR
FRANK W. CURTIS
BY Chapin + Neal
ATTORNEYS Patented July 14, 1942

2,289,874

UNITED STATES PATENT OFFICE 2,289,874

MILLING MACHINE

Frank W. Curtis, Springfield, Mass., assignor to Van Norman Machine Tool Company, Springfield, Mass., a corporation of Massachusetts Application November 20, 1940, Serial No. 366,391

5 Claims. (Cl. 90—17)

This invention relates to milling machines particularly designed for tool room use on such work as die sinking, profiling operations where no template is available; and in general in the production of work pieces having shapes built up of curves of different radii and having different centers, said curves being connected in some cases by straight lines which may or may not be parallel. The problems presented by the production of single work pieces of this general type have hitherto been among the most difficult in tool room practice, since it has been necessary to reset the work piece whenever a curve was to be cut having a different center from that on which the preceding operation was based.

In accordance with the present invention the work piece, when once clamped on the machine, need never be removed until all the operations have been performed upon it which can be done with the work clamped to the table of a milling machine. This is accomplished by forming, as an integral part of the table structure of a milling machine, a rotary saddle mounted upon the usual reciprocable saddle and preferably power driven; and by mounting upon this table a pair of cross slides permanently set at right angles to each other. The rotary saddle is suitably graduated so that its angular position relative to the reciprocatory saddle is determinable at all times, and the superposed cross slides are graduated to indicate at all times and without special adjustment their displacement relative to the axis of the rotary saddle. Once a work piece has been mounted upon the upper slide it can be moved successively to any desired position relative to the axis of the rotary table, each point of the work piece which is brought above this axis serving as a center about which the cutting operations may be performed. The radius of the cut will be determined by the displacement between the axis of the tool and the axis of the rotary saddle, which can be regulated either by a shiftable tool-carrying slide or by the reciprocatory saddle, preferably the former.

The manner in which these novel results are secured can be understood best from a consideration of one form of machine to which my invention has been applied. This illustrative form of the invention has been shown in the accompanying drawings, in which Fig. 1 is a side elevation of the machine;

Fig. 2 is an elevation thereof looking from the right in Fig. 1;

Fig. 3 is an enlarged detail, looking from the opposite side of the machine than Fig. 1, partially in section on line 3—3 of Fig. 4 and showing the rotary saddle as having been turned through ninety degrees;

Fig. 4 is a view taken from the left in Fig. 3, partly in median section;

Fig. 5 is a detail similar to a part of Fig. 2, but showing the tool head moved to a different angular position;

Fig. 6 is a diagrammatic view of the connecting gearing and control clutches for the reciprocatory and rotating saddles;

Fig. 7 is a diagrammatic view showing one form of change gearing and rapid traverse for driving the reciprocating and rotating saddles; and Fig. 8 is a diagram illustrating the milling of an illustrative work piece.

Figure 1:
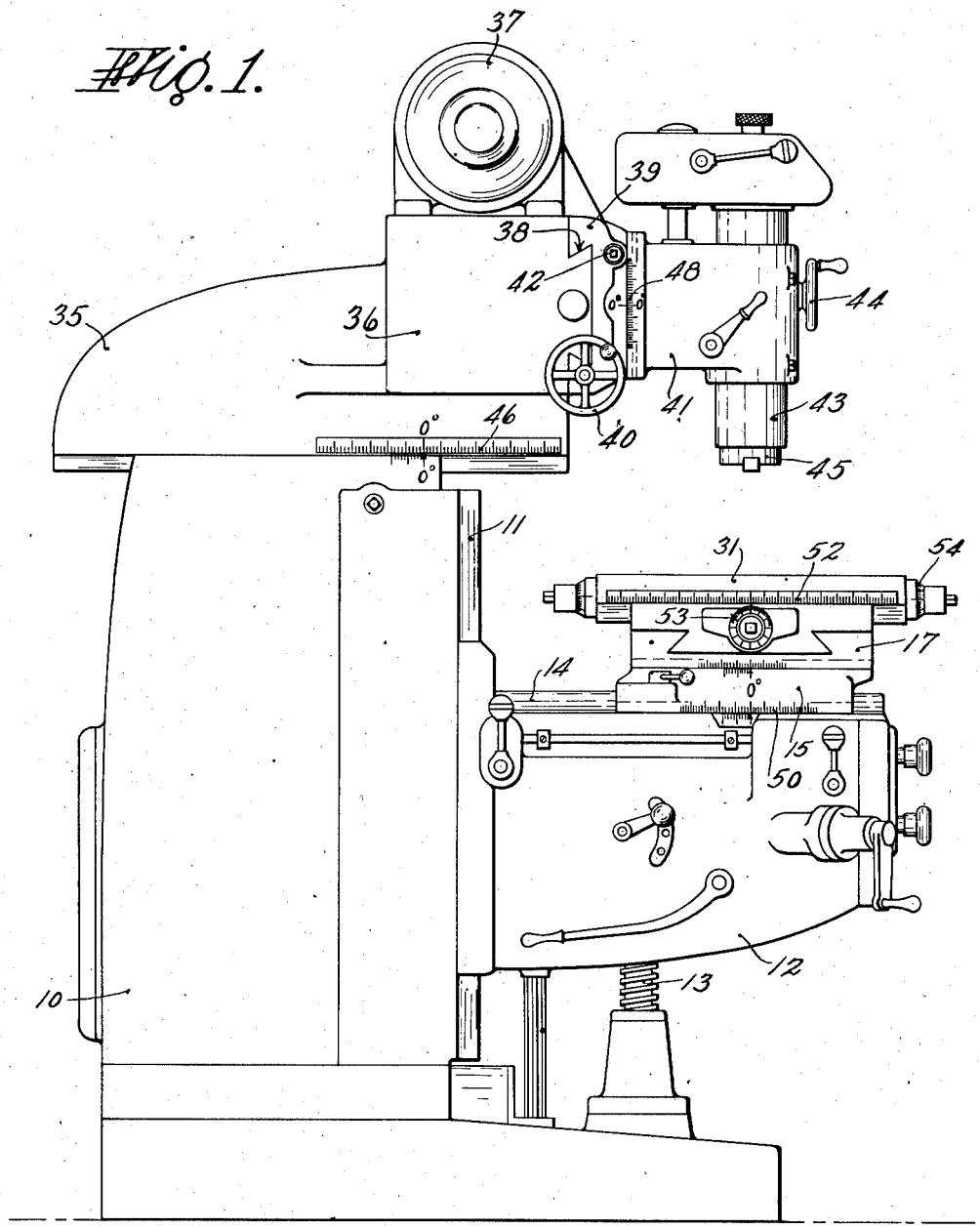

The machine has a column 10 provided on one side with vertical ways 11 upon which a knee 12 may be elevated or lowered by a suitable screw 13. The knee is provided with the conventional guideways 14 upon which the reciprocating saddle 15 moves toward and from the column. This saddle carries a bearing post 16 (Fig. 4) upon which a rotating saddle 17 may turn, the two saddles being fitted with guide surfaces 18 to preserve accuracy of alignment. T-slots 19 in the rotary saddle permit this to be clamped rigidly in position by any of the usual forms of clamping bolts. The rotary saddle has a worm gear 20 with which meshes a worm 21 on a shaft 22 driven by hand or by power as in the manner described below.

On the upper side of the rotary saddle are ways 23 in which a cross slide 24 is movable back and forth by a screw 25 journaled against axial motion in the slide and threaded into a nut 26 in the rotary saddle. In the upper side of the slide 24 are formed ways 30 at right angles to the ways 23, a second cross slide 31, controllable by a screw 32, being mounted therein. This upper slide is fitted with the usual T-slots 33 by which a work piece may be secured firmly in position.

Before considering the novel manner in which the work holding structure functions, the tool supporting mechanism will be described. The column 10 has suitable horizontal ways upon which a ram 35 moves in a direction parallel to the direction of movement of the reciprocatory saddle. This ram bears a gear box 36 driven from a motor 37 and which is furnished with cross ways 38 upon which moves a slide 39 controlled in its position as by a hand-wheel 40. A rotary head 41 is secured on the slide, and is controlled by a shaft 42 so that the head may be turned into any desired angular position. The head 41 bears a quill 43 movable axially by a handwheel 44 and containing a spindle 45 driven through suitable gearing in the head and gear box from the motor 37. The details of the head construction do not form part of the present invention and have therefore been omitted. Suitable head structures may be found in the prior art, but that shown in my copending application Serial No. 374,963, is especially applicable.

With the exception of the power transmission for the reciprocating and rotary saddles, the mechanism necessary for the practical application of the invention is now complete. In order to understand the operation it will be desirable at the start to consider the spindle 45 locked in a vertical position, as in Fig. 1. A tool mounted in this spindle therefore revolves upon a fixed axis. The ram is provided with a scale 46, the tool slide 49 with a scale 47, the rotating tool head 41 with a scale 48, and the quill 43 with a scale 49, each preferably fitted with verniers, so that the position of the axis of the tool is known and can be reproduced with certainty. In particular, with all of these adjustments set to zero the axis of the tool will be directly above the axis of rotation of the rotatable saddle when the reciprocable saddle is in a certain position indicated by a zero setting on a vernier scale 50 with which the reciprocable saddle is fitted. Any displacement of the reciprocable saddle with respect to this zero reading will displace the axis of rotation of the rotary saddle with respect to the axis of rotation of the tool and will therefore cause the tool to cut an arc, of a radius equal to this displacement, if the rotatable saddle is caused to revolve on its axis.

If a work piece is mounted on the upper cross slide 31 with a given point in line with the axis of rotation of the rotary saddle the cut will be made about this point as a center. In prior practice, which did not utilize the combination of slides described, it has been possible to make a cut about another point as center only by dismounting the work and re-clamping it in place. By the use of the two cross slides superposed on the rotary saddle it is possible to change the position of the work relative to the axis of the rotary saddle in any desired way, so that any predetermined point may be brought into alignment with the saddle axis and thus serve as a center about which a cut will be made. It should be noted that a similar result cannot be accomplished by the common expedient of placing cross slides beneath, rather than above, the rotary saddle; as this expedient merely changes the axis of the rotation of the saddle relative to the tool and does not change the point of the work which is in alignment with the saddle axis. While the radius of cut could be changed by these prior adjustments, the point of the work piece which is to serve as a center for the cut arc could only be changed by releasing the work and reclamping it after careful and time-consuming checks of position.

Similar results follow if the work is to be formed with cuts on parallel lines. If the rotary saddle be clamped and a cut made, another cut parallel to it at any predetermined distance can be made by shifting the proper cross slide that exact distance as determined by the cross slide scales 51 and 52 and the corresponding screw micrometers 53 and 54. These micrometers are preferably graduated to indicate smaller decimal divisions of slide movement than can be read directly from the slide scales. In this case a similar result could be accomplished through cross slides mounted beneath rather than above the rotary saddle, but in the lower location of the cross slides all power of choosing a desired center for a cut on the work piece would be lost.

In general it may be said that it will be more convenient to regulate the displacement of the axis of the tool and the axis of the rotary saddle by shifting the ram 35 or the tool slide 39 rather than the reciprocatory saddle 15. Any of these adjustments will enable an arc to be cut having a radius equal to the displacement measured by the corresponding scale, provided of course that a tool be used having a radius less than that of the arc to be cut. Assuming for consistency that the tool slide 39 is used for this purpose, it will be instructive to consider the cutting of a work piece such as that shown in Fig. 8, this work piece being considered to be of a type in which a hole of predetermined contour is to be cut out of its center. It will be understood, of course, that the machine is equally applicable to the milling of external surfaces or to the production of recessed work.

Let us assume that the cut includes a straight line portion $a$. A hole $b$ is first cut out tangent to the line and a cutter placed in the spindle which for simplicity we may assume is of a lesser radius than any cut to be made. With the cutter projecting through the hole the work piece is aligned on the upper slide and clamped in position with the rotary table clamped at zero. The tool slide 39 we may also assume set at zero. The cut $a$ may then be made by causing the reciprocatory saddle 15 to travel either by hand or power until the center of the cutter is brought to the line $c$, which marks the merger of the straight line $a$ into the curve $d$. The reciprocating saddle is then returned to the original position and the work again returned by one of the cross slides to bring the line $c$ into alignment with the axis of the tool. Curve $d$ is to be made of a radius $r_1$, and the tool slide 39 is adjusted to this reading, at the same time shifting the second cross slide until the face of the tool is brought back to tangency with the line $a$. The tool slide will be moved a distance $r_1$, and the cross slide a distance $r_0$ (the tool radius). If a cut has to be made into the center of the work piece it is of no consequence, as this is to be removed anyway, but a similar adjustment may be made without cutting by stopping the rotation of the tool and shifting the tool slide and the cross slide simultaneously.

With the tool and cross slides locked, the rotary saddle is then turned by power or hand through 90° with the tool rotating, and the cut $d$ thus made. A further measured travel of the reciprocatory saddle will cause the cut $f$ to be made. The curve $g$, of a radius $r_2$, is made in the manner described; as is the straight line $h$ and the curve $i$ of radius $r_3$. The curve $j$, however, is convex instead of concave, and the tool slide has to be shifted to the radius $r_4$ on the opposite side of its center from that previously used. Curve $k$ is again concave, and the initial procedure is resumed. Cut $l$ is on a slant, and the rotary saddle is adjusted to the proper angle and the cut made by simple traverse of the reciprocatory saddle. Curve $m$ and the remaining portion of cut $a$ require no further discussion.

In all the operations described it should be noted that it has never been necessary to unclamp and reset the work piece, since any desired radius, and any desired setting of the work piece, can be determined at will by the graduations with which the several slides are provided. Curves, parallel cuts, and cuts on any assigned angle, are accomplished with equal facility. Layout work, in which the cutter is replaced by a scribing point, is carried on in the same manner except that it is not necessary to make allowance for the radius of the tool. As far as I am aware, these results have not been possible with any previous type of milling machine since the necessary arrangement of cross slides above the rotary saddle has never been provided. A mere vise with cross slides attached by clamps to a rotary table cannot produce the same result, since the location of the axes of the cross slides with respect to the rotary tables would not be fixed and the angular and linear displacements could not be completely determined without an amount of direct measurement substantially equal to that required to deal with the work piece itself. By the arrangement of my invention, in which all slides, including the reciprocatory and rotary saddles, are permanently fixed in position so that their settings can be determined with accuracy by mere inspection, a facility of operations is attained never before made possible.

Other modified types of operation may be considered briefly. If it is desired to taper the cut, whether undercut or the opposite, the rotating tool head 41 may be shifted as in Fig. 5 and a suitable compensation made by shifting the tool slide an amount determined by the angular shift and the depth of cut, and the same sequence of operations carried on. If it is desired to drill a series of holes in definite angular positions upon one or more circles of known radius, a drill is set in the spindle, the tool slide set to the radius of the circle, and the rotary saddle adjusted successively to the required angular positions; the relative motion for drilling being accomplished either by the vertical elevation of the knee or by the vertical lowering of the quill.

It is desirable, in order to feed the work at a cutting rate and also to be able to reposition it for further adjustment as described above, that the reciprocatory and rotary saddles be capable of operation by power at either a cutting or a rapid traverse rate and in either direction. While various forms of gearing for this purpose may be used, I have shown for completeness one suitable arrangement. Referring to Fig. 7, a shaft 60 enters the knee from some driving source; and is provided with worm gearing 61 by which power is taken off to a change speed drive, and with bevel gearing 62 driving a rapid traverse shaft 63. The worm gearing 61, through connecting gears 64, drives a tumbler 65 selectively operating any one of a group of gears 66. These gears in turn operate a high-low combination 67 which finally drives a sleeve 68 in alignment with the rapid traverse shaft 63. The sleeve carries a feed clutch 69 and the shaft 63 a rapid traverse clutch 70 engageable selectively with two corresponding clutch members on a shaft 71 extending through the sleeve 68 and bearing a terminal drive gear 72. This terminal gear is thus driven at either feed rate or at rapid traverse as may be determined by appropriate gear and clutch settings, and the power drive for the table movements is taken off from it.

The transmission mechanism for the reciprocatory and rotary saddles is shown diagrammatically in Fig. 6. The terminal gear 72 meshes with an idler 75 which in turn meshes with two gears 76, 77. The latter of these is fixed to the shaft of a gear 78 meshing with a gear 79 coaxial with gear 76. A reversing and stopping clutch 80 interposed between these coaxial gears is keyed to a threaded shaft 81 engaging a nut 82 on the reciprocatory saddle 15 to move it back and forth.

The common shaft 83 of the gears 77 and 78 is splined to a gear 84 journaled in the reciprocatory saddle and meshing through an idler 85 with a gear 86. On the same shaft with the latter gear is a gear 87 meshing with one gear 88 of a reversing couple. The gear 85 also meshes with a gear 89 forming the second gear of the couple. The reversing and stopping clutch 90 is mounted between these gears on the shaft of a gear 91 which meshes with a gear 92 on the worm drive shaft 22. By this means the rotary saddle may be driven by power in either direction or permitted to remain stationary as may be desired.

The controls for the clutches 80 and 90 may be located in any convenient place, clutch 80 being shown as controlled by a handle 95 and clutch 90 as controlled by a handle 96. The rapid traverse clutch is controlled by a handle 97, preferably spring biased so that it normally tends to remain in feeding, rather than in rapid traverse, position. Besides these power controls each of the movements may be actuated by hand, reciprocatory saddle by a handle 98 on the projecting end of shaft 81 and the rotary table by a squared extension 99 on the shaft 22.

I claim:

1. A milling machine comprising a column, a knee vertically adjustable thereon, a reciprocatory saddle adjustably mounted on the knee for movement toward and from the column, a rotary saddle mounted on the reciprocatory saddle, a pair of superposed work slides mounted at right angles one to another upon the rotary saddle, a spindle, and means for adjusting the spindle both angularly and laterally in a plane at right angles to the direction of movement of the reciprocatory saddle and means for adjusting the spindle parallel to its own axis.

2. A milling machine comprising a column, a knee vertically adjustable thereon, a reciprocatory saddle adjustably mounted on the knee for movement toward and from the column, a rotary saddle mounted on the reciprocatory saddle, a pair of superposed work slides mounted at right angles one to another upon the rotary saddle, a spindle, means for adjusting the spindle angularly in a plane at right angles to the direction of movement of the reciprocatory saddle, and means for causing relative adjustment between the spindle and the rotary saddle in a direction at right angles to the direction of movement of the reciprocatory saddle.

3. A milling machine comprising a rotary saddle, a pair of superposed work slides mounted at right angles one to another upon the rotary saddle, a spindle, means for adjusting the rotary saddle and the spindle relative to each other in two horizontal directions at right angles one to the other, means for adjusting the axis of the spindle angularly in a plane at right angles to the plane including said two directions, means for adjusting the spindle parallel to its own axis irrespective of the angular position of adjustment thereof, and means for adjusting the rotary table and the spindle relative to each other in a direction at right angles to the plane including said two directions.

4. A milling machine comprising a column, a knee, a reciprocatory saddle on the knee movable toward and from the column, a rotary saddle mounted upon the reciprocatory saddle for rotation about a vertical axis, a pair of cross-slides mounted at right angles one to the other upon the rotary saddle, a ram upon the column movable in a direction parallel to that of the reciprocatory saddle, a tool spindle movable upon the ram at right angles to the axis of rotation of said spindle, a tool head rotatably mounted on the cross-slide, and a spindle axially movable in said rotary tool head.

5. A milling machine comprising a column, a knee, a reciprocatory saddle on the knee movable toward and from the column, a rotary saddle mounted upon the reciprocatory saddle for rotation about a vertical axis, a pair of cross-slides permanently mounted at right angles one to the other upon the rotary saddle, a ram upon the column movable in a direction parallel to that of the reciprocatory saddle, a tool spindle movable upon the ram at right angles to the axis of rotation of said spindle, a tool head rotatably mounted on the cross-slide, a spindle axially movable in said rotary tool head, means for indicating the relative displacement of the cross-slides with respect to the axis of rotation of the rotary saddle, means for indicating the absolute displacement between the axis of the tool spindle and the axis of rotation of the rotary saddle, and means for indicating the angular displacement of the rotary saddle with respect to the reciprocatory saddle.

FRANK W. CURTIS.